(12) United States Patent
Menon et al.

(10) Patent No.: US 8,766,112 B2
(45) Date of Patent: Jul. 1, 2014

(54) OCCUPANT WEIGHT SENSING USING INTELLIGENT FASTENER AND VERTICAL LOAD TRANSMITTING BRACKETS

(75) Inventors: Mithran Gopinathan Menon, Bloomfield Hills, MI (US); Rajeev Thakur, Novi, MI (US); Jerry Harder, Grosse Pointe Woods, MI (US); Prasanna Sampigehalli Narasimaiah, Bangalore (IN); Madhusudhanrao Mulinti, Guntakal (IN)

(73) Assignee: Robert Bosch GmbH, Stuttgart (DE)

( * ) Notice: Subject to any disclaimer, the term of this patent is extended or adjusted under 35 U.S.C. 154(b) by 345 days.

(21) Appl. No.: 13/185,788

(22) Filed: Jul. 19, 2011

(65) Prior Publication Data

US 2012/0012405 A1    Jan. 19, 2012

Related U.S. Application Data

(60) Provisional application No. 61/365,683, filed on Jul. 19, 2010.

(51) Int. Cl.
*B60R 21/015* (2006.01)
*G01G 19/08* (2006.01)

(52) U.S. Cl.
USPC .......... 177/136; 177/144; 180/273; 280/735; 73/862.46; 73/1.13; 702/173

(58) Field of Classification Search
USPC ............ 73/1.13, 1.15, 862.46; 177/136, 144; 180/273; 280/735; 702/173, 174
See application file for complete search history.

(56) References Cited

U.S. PATENT DOCUMENTS

| | | | |
|---|---|---|---|
| 6,092,838 A | 7/2000 | Walker | |
| 6,293,585 B1 | 9/2001 | Bruns et al. | |
| 6,323,444 B1 * | 11/2001 | Aoki | 177/144 |
| 6,448,512 B1 * | 9/2002 | Cooper | 177/144 |
| 6,571,647 B1 * | 6/2003 | Aoki et al. | 73/862.381 |
| 6,586,948 B1 | 7/2003 | Aoki et al. | |
| 6,859,753 B1 * | 2/2005 | Thakur et al. | 702/173 |
| 6,903,380 B2 * | 6/2005 | Barnett et al. | 257/98 |
| 6,943,695 B2 | 9/2005 | Kobata | |
| 7,000,489 B2 | 2/2006 | Kobata et al. | |
| 7,061,389 B2 | 6/2006 | Senoo | |
| 7,096,745 B2 | 8/2006 | Kobata | |
| 7,841,439 B2 * | 11/2010 | Ishikawa et al. | 180/273 |
| 2003/0106723 A1 * | 6/2003 | Thakur et al. | 177/144 |
| 2005/0049824 A1 * | 3/2005 | Thakur et al. | 702/173 |

* cited by examiner

*Primary Examiner* — Randy W Gibson (74) *Attorney, Agent, or Firm* — Michael Best & Friedrich LLP (57) ABSTRACT

An occupant weight sensing apparatus configured to be coupled to a vehicle seat. The apparatus includes a base configured to be connected to a vehicle, a lever pivotally connected to the base, a rocker configured to be connected to the vehicle seat, the rocker also pivotally connected to the lever, and a sensor coupled to the lever. A force applied to the seat causes pivotal movement of the lever relative to the base. The sensor detects the pivotal movement to sense the weight of the occupant.

12 Claims, 10 Drawing Sheets

OCCUPANT WEIGHT SENSING USING INTELLIGENT FASTENER AND VERTICAL LOAD TRANSMITTING BRACKETS

RELATED APPLICATIONS

The present application claims priority to U.S. Provisional Application No. 61/365,683 filed on Jul. 19, 2010, the entire contents of which are incorporated herein by reference.

BACKGROUND

Embodiments of the invention relate to measuring the weight of an occupant sitting in the seat of a vehicle.

The operation of vehicular occupant safety systems (such as airbag and seatbelt systems) is sometimes varied depending on the weight of the occupant sitting in the seat (protected by the relevant safety system). A number of weight-sensing technologies exist for this purpose.

SUMMARY

The invention provides, among other things, an improved bracket configuration whereby occupant weight is transferred from seat rails positioned along the bottom of a seat through two brackets (one per each side of the seat) to a sensor or load cell, such as a Hall effect sensor, particularly in the form of a sensor that replaces a securing fastener such as a bolt. A specific example of such an intelligent fastener suitable for use with the brackets is available from Robert Bosch GmbH under the trademark iBolt. The sensor or load cell could also be based on other technologies such as strain gauge technologies (e.g., thick film strain gauge, thin film strain gauge, semiconductor strain gauge), eddy-current technologies, etc. The brackets are configured such that loads (i.e., a portion of the seat weight) from more than one corner of the seat are mechanically added at the sensor or load cell.

The invention also provides an occupant weight sensing apparatus configured to be coupled to a vehicle seat. The apparatus includes a base configured to be connected to a vehicle, a lever pivotally connected to the base, a rocker configured to be connected to the vehicle seat, the rocker also pivotally connected to the lever, and a sensor coupled to the lever. A force applied to the seat causes pivotal movement of the lever relative to the base. The sensor detects the pivotal movement to sense the weight of the occupant.

The invention also provides an occupant weight sensing apparatus configured to be coupled to a vehicle seat, the apparatus comprising: a base configured to be connected to a vehicle; a lever including a lever bracket pivotally connected to the base and configured to be connected to the vehicle seat, and a loading bracket that extends from the lever bracket; and a sensor coupled to the loading bracket, the sensor configured to detect pivotal movement of the lever relative to the base to sense the weight of the occupant.

The invention also provides an occupant weight sensing apparatus configured to be coupled to a vehicle seat, the apparatus comprising: a lever configured to be pivotally connected to a vehicle; a rocker configured to be connected to the vehicle seat, the rocker also pivotally connected to the lever; and a sensor coupled to the lever, the sensor configured to detect pivotal movement of the lever relative to the base to sense the weight of the occupant.

The invention also provides an occupant weight sensing apparatus configured to be coupled to a vehicle seat, the apparatus comprising: a lever including a lever bracket configured to be pivotally connected to a vehicle and configured to be connected to the vehicle seat, and a loading bracket that extends from the lever bracket; and a sensor coupled to the loading bracket, the sensor configured to detect pivotal movement of the lever relative to the base to sense the weight of the occupant.

Other features and advantages of the invention will become apparent to those skilled in the art upon review of the following detailed description, claims, and drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

The system 100 illustrated in the drawings provides an apparatus that connects a vehicle seat to the floor of the vehicle and also detects a weight of an occupant of the seat. The weight determination sensed by the system is then used to control various components and apparatuses of the vehicle including, for example, an airbag or other vehicle occupant restraint system. The system 100 is an improvement over prior systems such as described in U.S. Pat. No. 6,859,753 titled APPARATUS AND METHOD FOR MEASURING THE WEIGHT OF AN OCCUPANT IN A VEHICLE, which is incorporated herein by reference.

Figure 1A:
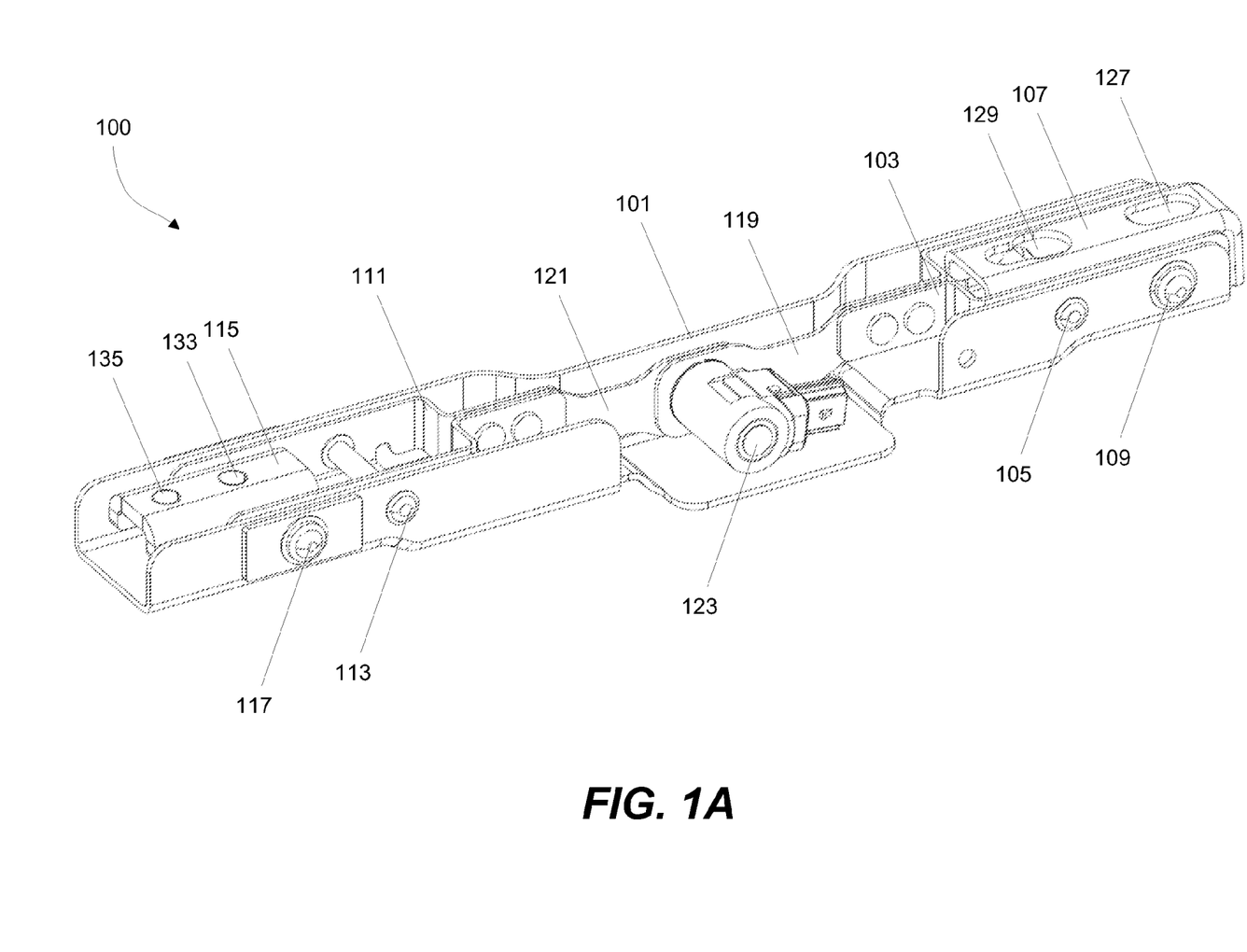
FIG. 1A is a perspective view of one side of the weight sensing system.

As illustrated in FIG. 1A, the system 100 includes a base or support bracket 101 mounted on the floor of the vehicle or attached to feet or risers that mount on the floor of the vehicle. The structure and function of the base is described in further detail below. A front lever including a front lever bracket 103 is pivotally connected to the base 101 by the front pivot pin 105. A front rocker bracket 107 is pivotally connected to the front lever bracket 103 by the front limit pin 109. This arrangement allows the front rocker bracket 107 to pivot relative to the front lever bracket 103 and also allows the front lever bracket 103 to pivot relative to the base 101. The front limit pin 109, as described further below, prevents the front lever bracket 103 from pivoting beyond a maximum pivot angle. The rear portion of the system includes similar corresponding components. A rear lever including a rear lever bracket 111 is pivotally connected to the base 101 by a rear pivot pin 113 and a rear rocker bracket 115 is pivotably connected to the rear lever bracket 111 by the rear limit pin 117.

The front lever also includes a front loading bracket 119 extending from the front lever bracket 103. The front loading bracket 119 is fixedly connected to the front lever bracket, preferably by rivets, and is connected to a sensor 123 as described below. As such, when the front lever bracket 103 pivots around the front pivot pin 105, the front loading bracket 119 is raised or lowered. This movement is detected by the sensor 123 and is used to determine the weight of an occupant of the vehicle. A corresponding rear loading bracket 121 extends from the rear lever bracket 111 and the movement of the rear loading bracket 121 is also detected by the sensor 123.

Figure 1B:
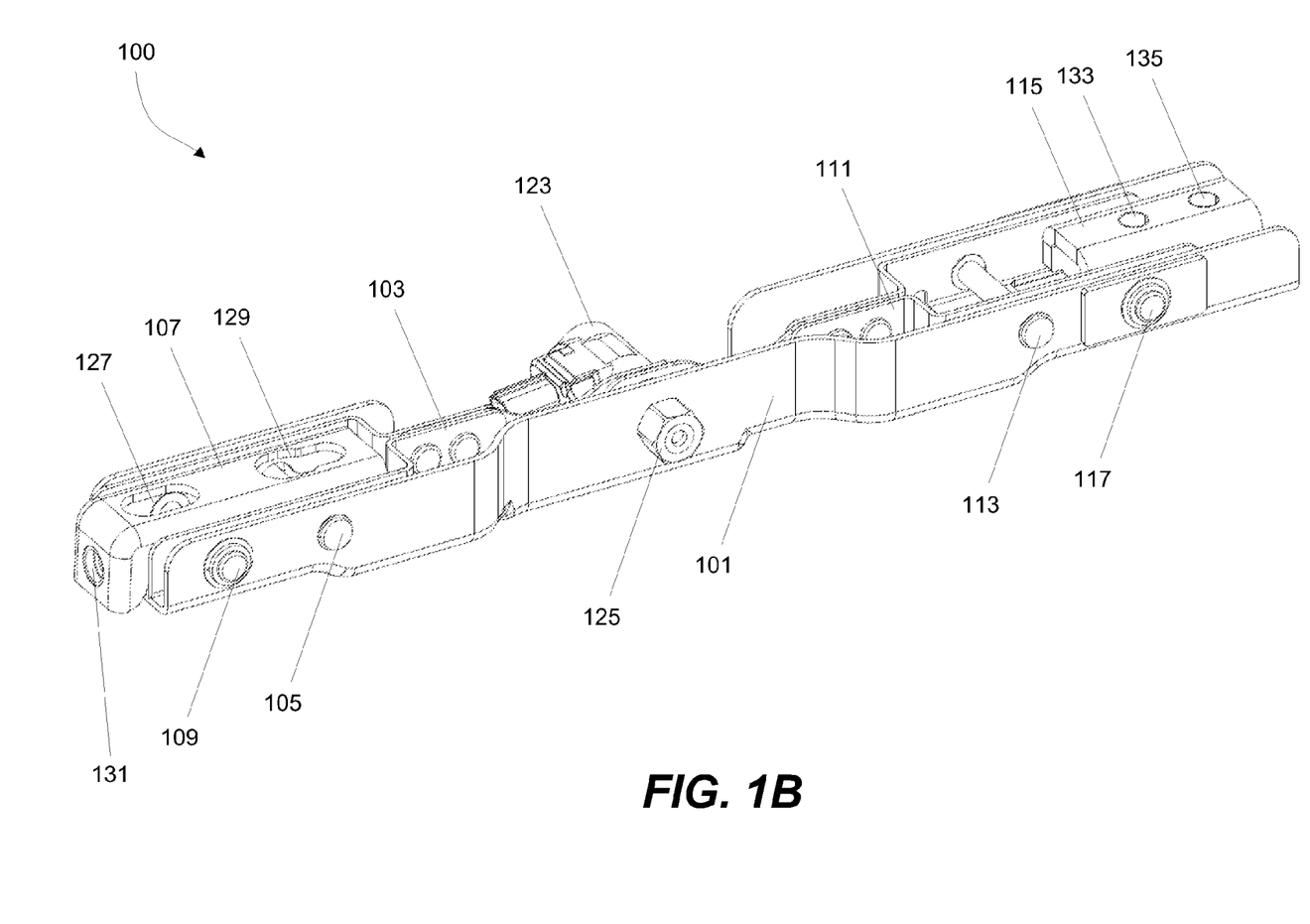
FIG. 1B is a perspective view of the other side of the weight sensing system.

The system of FIG. 1A is positioned beneath a seat in a vehicle. The front rocker bracket 107 is positioned near the front of the seat and the rear rocker bracket 115 is positioned near the rear of the seat. The system 100 is positioned along the left side of the vehicle seat and a corresponding, symmetric system is installed along the right side of the vehicle seat. Each of the four corners of the vehicle seat is attached to one of the rocker brackets. For example, the left front corner of the vehicle seat is attached to the front rocker bracket 107 of the system 100 of FIG. 1A. As illustrated in FIG. 1B, the front rocker bracket 107 includes three apertures: a guide aperture 127, a key-lock aperture 129, and a threaded screw aperture 131. To attach the vehicle seat to the front rocker bracket, pins extending from the lower track of the seat are inserted into the guide aperture 127 and the key-lock aperture 129. The lower track is slid toward the rear of the system 100 and locks into place. The lower track is then held in place by a screw installed in the threaded aperture 131. Similarly, two bolts on the lower track are attached to the rear rocker bracket 115 through two additional apertures 133, 135. An example of a lower track and a vehicle seat are described in further detail in U.S. Pat. No. 6,859,753 which has been incorporated by reference above.

Figure 4:
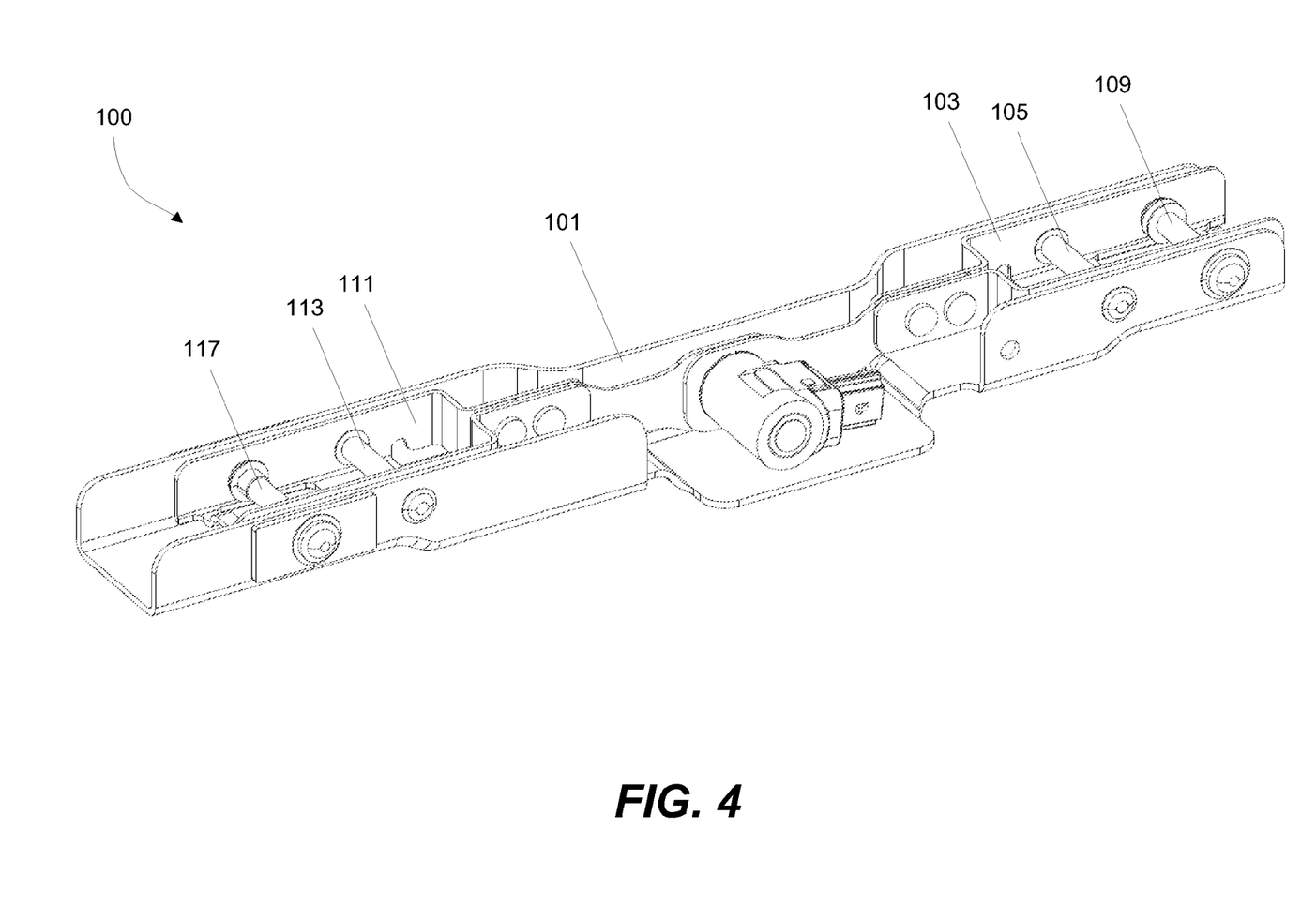
FIG. 4 is a view similar to FIG. 1B without a front or rear rocker bracket.
Figure 10:
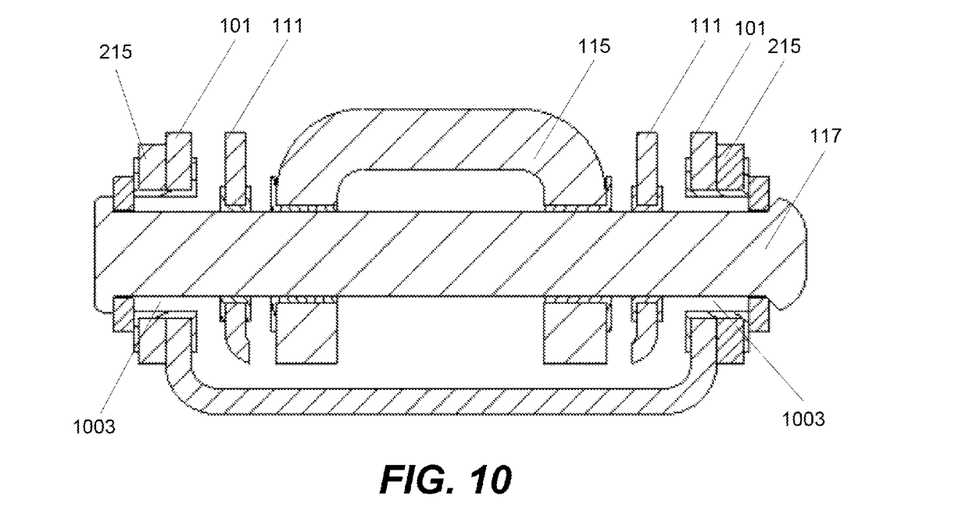
FIG. 10 is a cross-sectional view along a rear limit pin.

In the system 100, the sensor 123 is a hall-effect sensor which also acts as a support bolt. One example of such a sensor is available from Robert Bosch GmbH under the trademark iBolt. The sensor 123 includes a threaded bolt that extends through an aperture in the base 101 and that is secured by a threaded nut 125. The sensor 123 is thus fixed to the base. The sensor also extends through apertures 311 in the front loading bracket 119 and in the rear loading bracket 121, as best shown in FIGS. 4 and 10 and as described in detail below.

After the seat is attached to the rocker brackets, the system 100 both supports the seat and measures the weight of a person sitting in the seat. Weight applied to the front left corner of the vehicle seat is transferred to the front rocker bracket 107. The force applied to the front rocker bracket 107 causes the front lever bracket 103 to pivot at the front pivot pin 105. This pivoting movement causes the front loading bracket 119 to move upward relative to the sensor 123. Similarly, weight applied to the rear left corner of the seat is transferred to the rear rocker bracket 115. This force causes the rear lever bracket to pivot at the rear pivot pin 113 and causes the rear loading bracket 121 to move upward relative to the sensor 123. Movements of the front loading bracket 119 and the rear loading bracket 121 relative to the base cause the bolt to become angled relative to the housing of the sensor 123. This creates a hall-effect which enables the sensor 123 to detect the magnitude of forces exerted upon the iBolt. The sensor 123 detects a combined force caused by the upward movement of both the front loading bracket 119 and the rear loading bracket 121. A signal indicative of this combined force is transmitted to a control unit (including a processor and a computer-readable memory) and is used to calculate the weight of the occupant of the seat. An example of such a calculation is described in U.S. Pat. No. 6,859,753.

Although the system 100 illustrated in FIGS. 1A and 1B includes a hall-effect sensor in the form of an iBolt, other embodiments of the system 100 can include other types of force, motion, or strain sensors including, but not limited to a thick film strain gauge, a thin film strain gauge, a semiconductor strain gauge, eddy-current sensors, or other types of hall-effect sensors.

Figure 2:
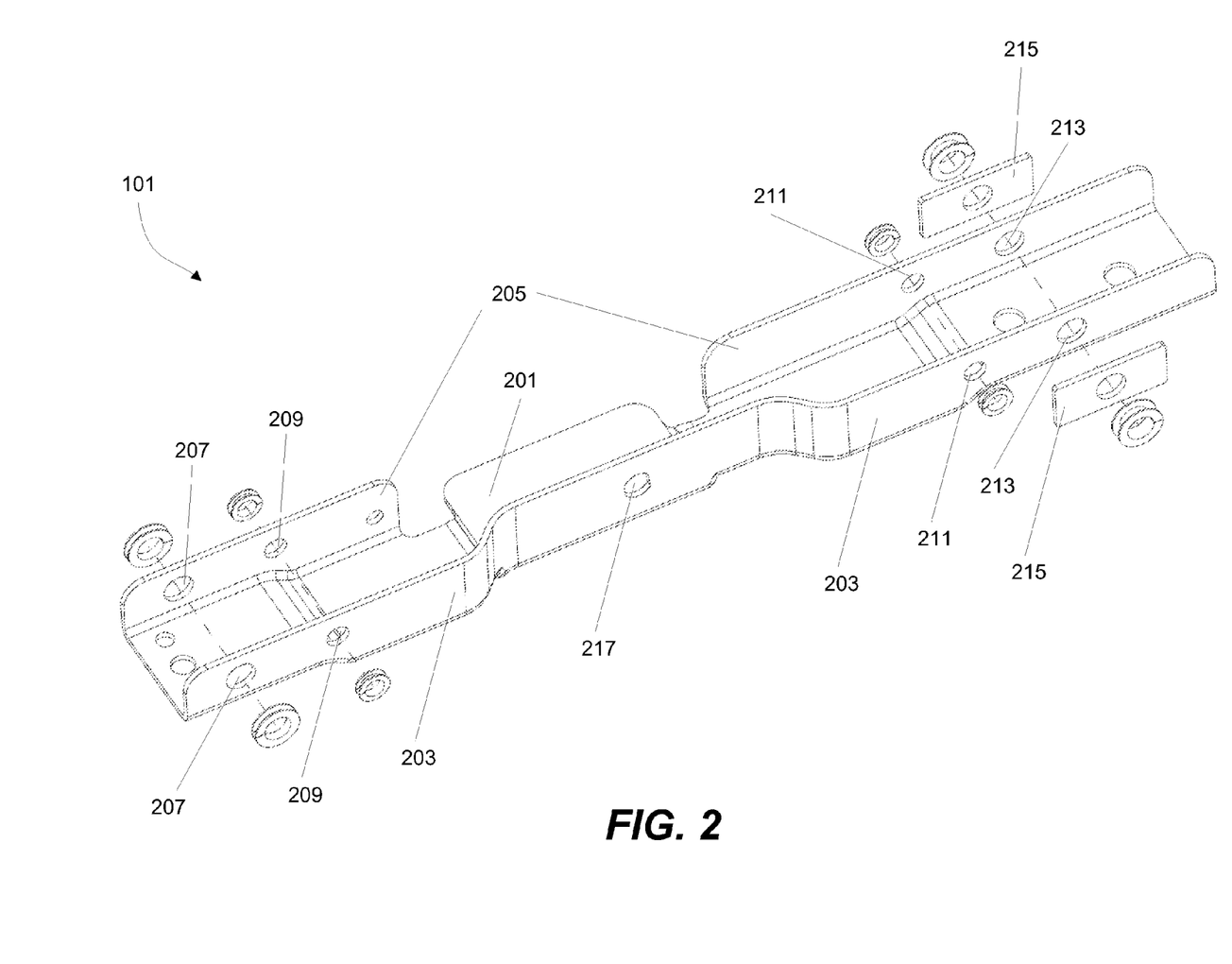
FIG. 2 is an exploded view of a base of the weight sensing system of FIGS. 1A and 1B.

FIG. 2 illustrates an exploded view of the base 101. The base is formed of a single piece of metal, but is shaped to include a bottom wall 201, a first side wall 203, and a second side wall 205. The second side wall 205 includes front and rear portions. Several apertures are provided through the side walls 203, 205 of the base 101. A pair of rear limit pin apertures 207 and a pair of rear pivot pin apertures 209 are positioned towards the rear of the first wall 203 and the second wall 205. Similarly, a pair of front pivot pin apertures 211 and a pair of front limit pin apertures 213 are positioned toward the front of the first wall 203 and the second wall 205. Bushings are located inside each of these apertures to provide for smoother rotation of the pins within each aperture. Each of the bushings positioned in the front limit pin apertures 213 also extends to the outside surface of a weld plate 215. The first side wall 203 also includes a centrally located sensor aperture 217 for receiving the bolt of the sensor 123.

Figure 3:
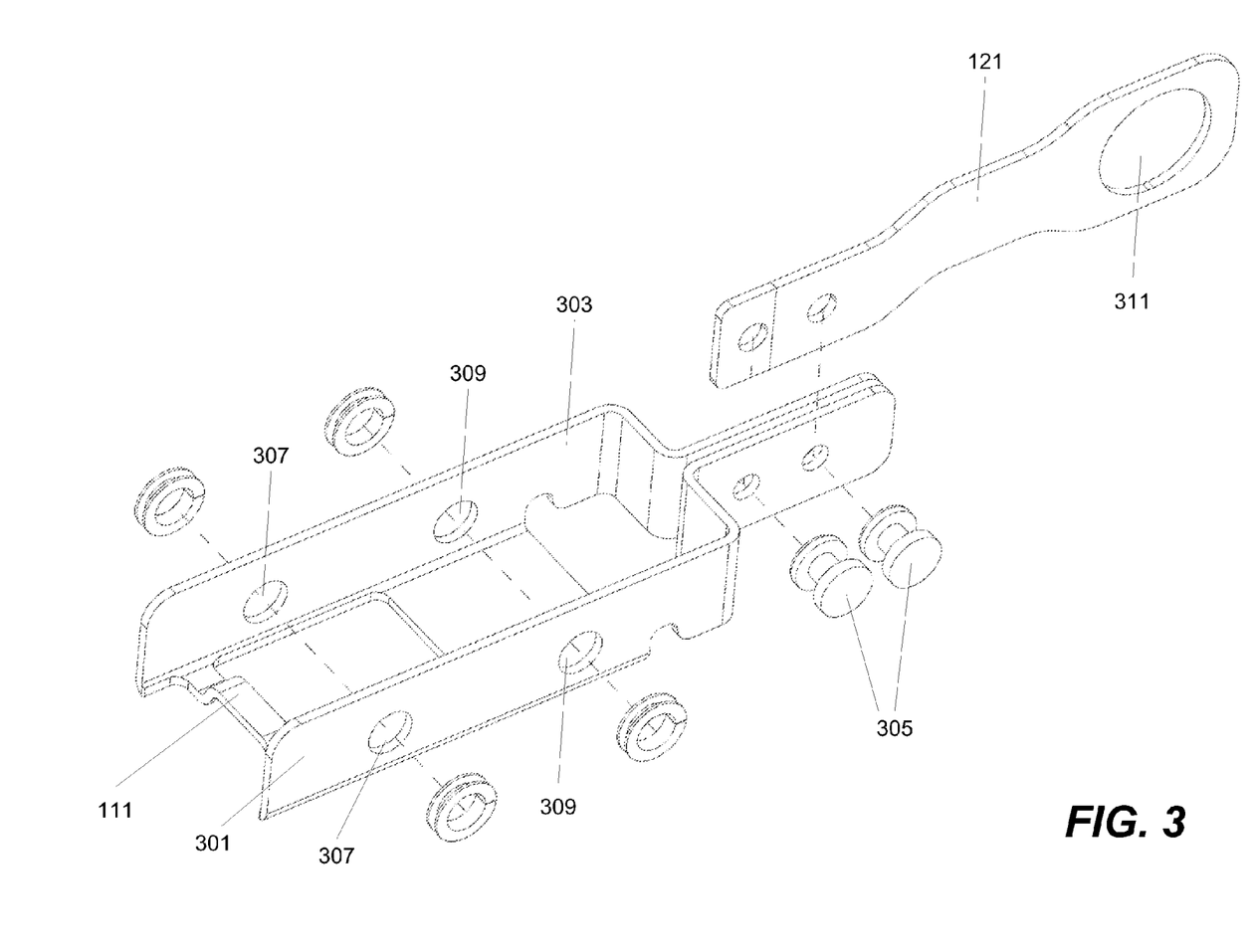
FIG. 3 is an exploded view of a lever of the weight sensing system of FIGS. 1A and 1B.

FIG. 3 illustrates an exploded view of the rear lever 110. The front lever is constructed similarly. The rear lever bracket 111 includes a first side wall 301 and a second side wall 303. The side walls 301, 303 are somewhat s-shaped and combine to form the shape of a fork. The rear loading bracket 121 extends between the side walls 301, 303 in a narrow portion of the fork-shaped bracket. The rear loading bracket 121 is attached to the rear lever bracket 111 and held in place by a pair of rivets 305. Alternatively, the three pieces can be welded together. Each side wall 301, 303 includes a limit pin aperture 307 and a pivot pin aperture 309. The apertures 307 and 309 have therein bushings.

FIG. 4 shows the base 101 without the rear lever bracket 111 and the front lever bracket 103 installed. The rear pivot pin 113 extends through both rear pivot pin apertures 307, 207 of the rear lever bracket 111 and the base 101. The rear limit pin 117 extends through both rear limit pin apertures 309, 209 of the rear lever bracket 111 and the base 101.

Figure 5:
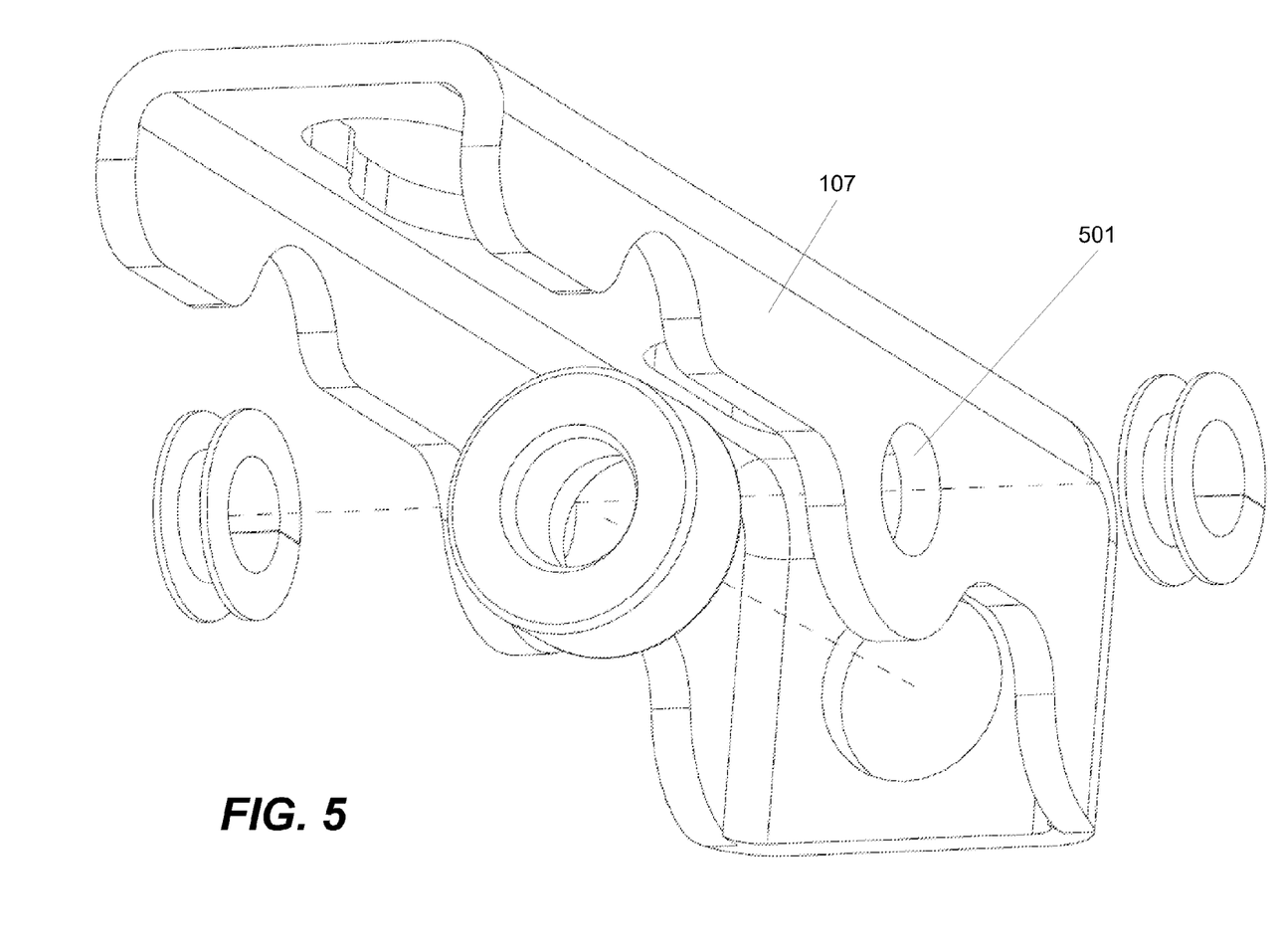
FIG. 5 is an exploded view of a front rocker bracket.

FIG. 5 shows an exploded view of the front rocker bracket 107. The front rocker bracket includes a pair of front limit pin apertures 501. As shown in FIG. 1A above, the front limit pin 109 extends through the front limit pin apertures 501 to pivotably connect the front rocker bracket 107 to the front lever bracket 103. Bushings are shown but not numbered.

Figure 6:
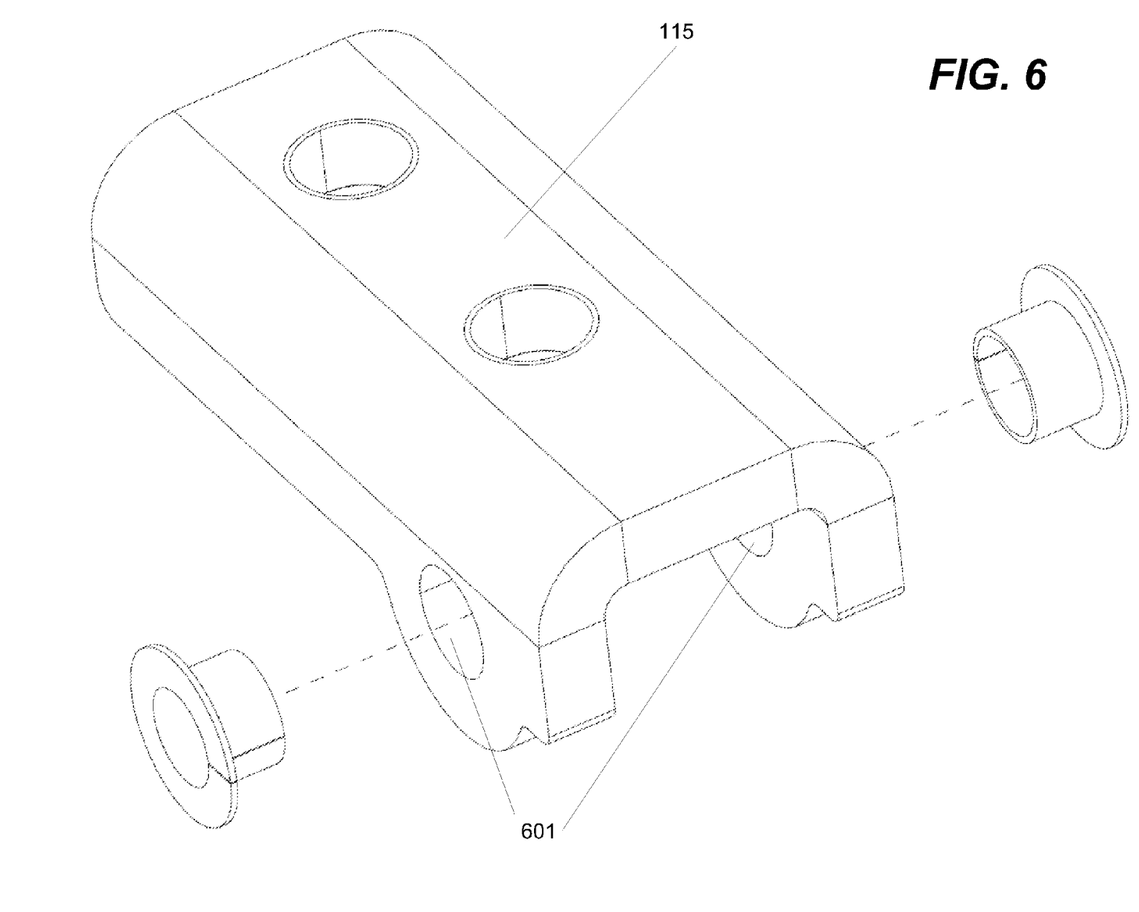
FIG. 6 is an exploded view of a rear rocker bracket.

FIG. 6 shows an exploded view of the rear rocker bracket 115. The rear rocker bracket 115 includes a pair of rear limit pin apertures 601. To pivotably connect the rear rocker bracket 115 to the rear lever bracket 107, the rear limit pin 117 is extended through the rear limit pin apertures 601. Bushings are shown but not numbered.

Figure 7:
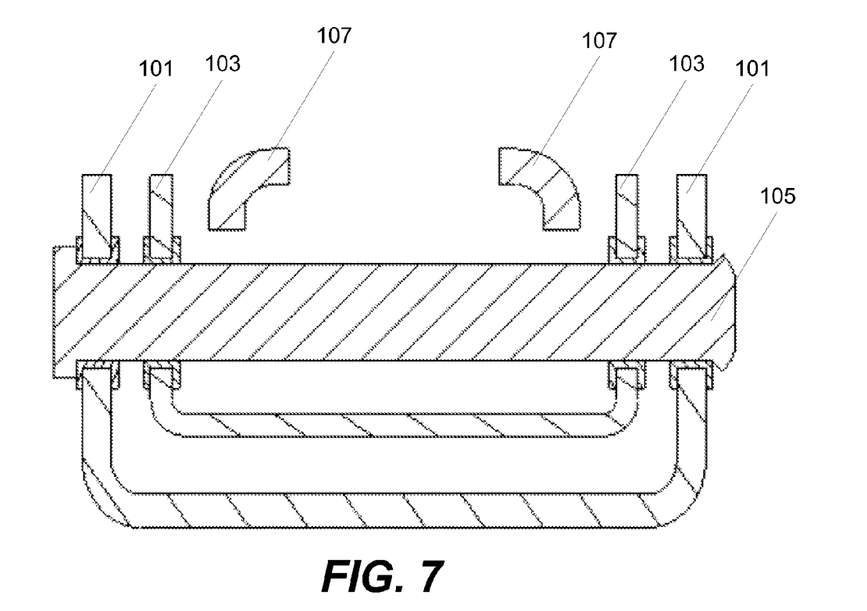
FIG. 7 is a cross-sectional view along a front pivot pin.

FIG. 7 is a cross-sectional view along the front pivot pin 105. As described above, the front pivot pin 105 extends through the front pivot pin apertures of both the base 101 and the front lever bracket 103. The front pivot pin 105 does not extend through the front rocker bracket 107 and, therefore, does not restrict the pivoting movement of the front rocker bracket 107. Lateral movement of the front pivot pin 105 is restricted for example, by a nut on the end of the front pivot pin 105 or by orbital peening of the front pivot pin 105 to create a riveted joint.

Figure 8:
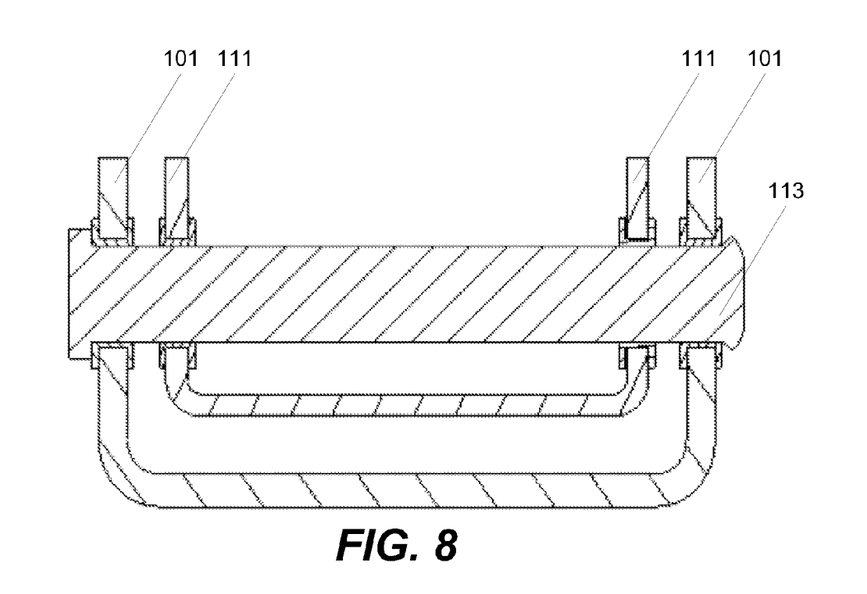
FIG. 8 is a cross-sectional view along a rear pivot pin.

FIG. 8 is a cross-sectional view along the rear pivot pin 113. Again, the rear pivot pin 113 extends through the rear pivot pin apertures of both the base 101 and the rear lever bracket 111. The rear pivot pin 113 does not extend through the rear rocker bracket 115 and, therefore, does not restrict the pivoting movement of the rear rocker bracket 115. Lateral movement of the rear pivot pin 113 is restricted for example, by a nut on the end of the rear pivot pin 113 or by using a rivet for the rear pivot pin 113.

Figure 9:
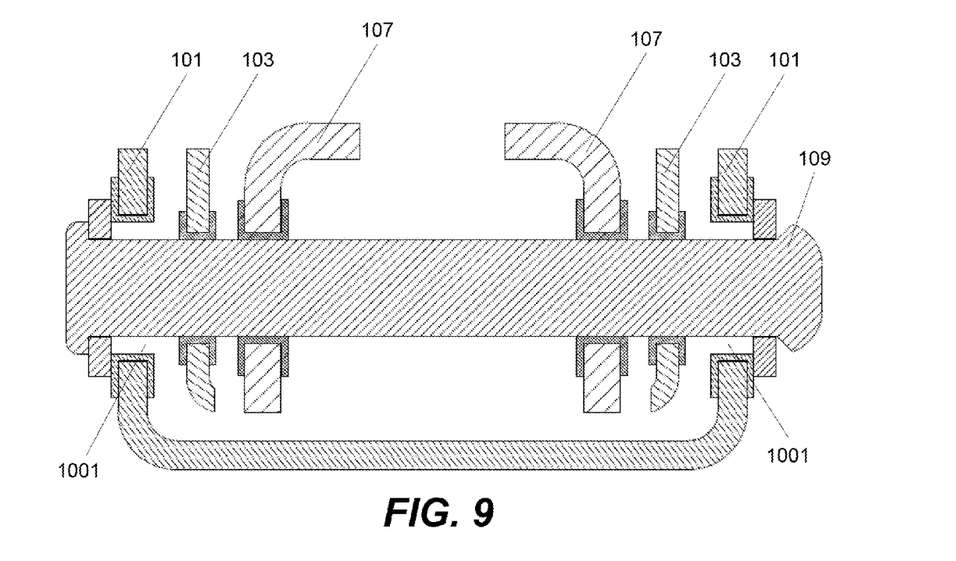
FIG. 9 is a cross-sectional view along a front limit pin.

FIG. 9 is a cross-sectional view along the front limit pin. The front limit pin 109 extends through the front limit pin apertures of the base 101, the front lever bracket 103, and the front rocker bracket 107. Although the front limit pin apertures of the front lever bracket 103 and the front rocker bracket 107 are sized to snugly receive the front limit pin 109, the front limit pin apertures of the base 101 are sized to leave a gap 1001 between the front limit pin and the side wall of the base 101. As described above, this arrangement allows the front lever bracket 103 to pivot up to a maximum pivot angle. When the front lever bracket 103 reaches the maximum pivot angle, the front limit pin 109 contacts the side wall of the base 101 and closes the gap 1001. This prevents further pivoting movement of the front lever bracket 103. In other words, the base includes a stop surface configured to engage the pin to limit movement of the lever 103 relative to the base. Lateral movement of the front limit pin 109 is restricted for example, by a nut on the end of the front limit pin 109 or by orbital peening of the front limit pin 109 to create a riveted joint.

FIG. 9 shows that the front lever bracket 103 nests inside the side walls of the base 101, and the front rocker bracket 107 nests inside the front lever bracket 103. Alternatively, the rocker bracket could nest outside the lever bracket.

FIG. 10 is a cross-sectional view along the rear limit pin. The rear limit pin 117 extends through the rear limit pin apertures of the weld plates 215, the base 101, the rear lever bracket 111, and the rear rocker bracket 115. Although the rear limit pin apertures of the rear rocker bracket 115 and the rear lever bracket 111 are sized to snugly receive the rear limit pin 117, the rear limit pin apertures of the base 101 are sized to leave a gap 1003 between the rear limit pin and the side wall of the base 101. As described above, this arrangement allows the rear lever bracket 111 to pivot up to a maximum pivot angle. When the rear lever bracket 111 reaches the maximum pivot angle, the rear limit pin 117 contacts the side wall of the base 101 and closes the gap 1003. This prevents further pivoting movement of the rear lever bracket 111. In other words, the base includes a stop surface configured to engage the pin to limit movement of the lever bracket 101 relative to the base. Lateral movement of the rear limit pin 117 is restricted for example, by a nut on the end of the rear limit pin 117 or by orbital peening of the rear limit pin 117 to create a riveted joint.

FIG. 10 shows that the rear lever bracket 111 nests inside the side walls of the base 101 and the rear rocker bracket 115 nests inside the rear lever bracket 111. Alternatively, the rocker bracket could nest outside the lever bracket.

Figure 11:
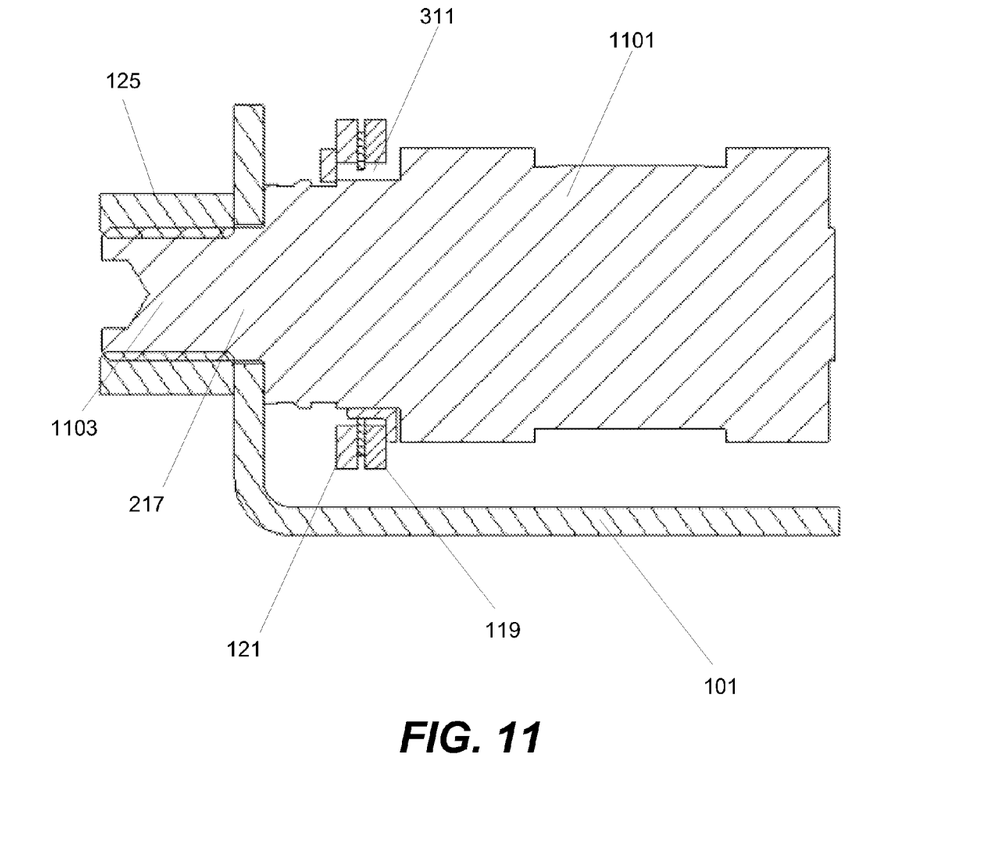
FIG. 11 is a cross-sectional view through a sensor.

FIG. 11 is a cross-sectional view through the sensor 123. The sensor includes a housing 1101 and a threaded bolt 1103 extending from the housing 1101. The threaded bolt 1103 extends through the sensor aperture 217 of the base 101 and is secured by a threaded nut 125 on the opposite side of the sidewall of the base 101. The housing 1101 of the sensor extends through the apertures of the front loading bracket 119 and the rear loading bracket 121. As described above, when the front and rear loading brackets 119, 121 pivot, the housing 1101 of the sensor moves relative to the base 101. This movement causes the angle of the threaded bolt 1103 to change relative to the housing 1101. This change of angle is detected by a hall-effect sensor positioned within the housing 1101 of the sensor.

It is to be understood that the examples provided above are exemplary and do not represent the only possible configuration of a system according to the invention. For example, the lever bracket and the loading bracket are described as two separate pieces that are attached by a pair of rivets. However, in some embodiments, the lever bracket and the loading bracket can be manufactured as a single piece. Furthermore, although the system is described as using an iBolt as the sensor, a system according to this invention can include any sensor that measures displacement, force, or strain.

Various features and advantages of the invention are set forth in the following claims.

What is claimed is:

1. An occupant weight sensing apparatus configured to be coupled to a vehicle seat, the apparatus comprising:
    a base configured to be connected to a vehicle;
    a lever pivotally connected to the base;
    a rocker configured to be connected to the vehicle seat, the rocker also pivotally connected to the lever, wherein a force applied to the vehicle seat causes a pivotal movement of the lever; and
    a sensor coupled to the lever, the sensor configured to detect the pivotal movement of the lever relative to the base to sense a weight of the occupant,
    wherein the lever is connected to the base for pivotal movement about a generally horizontal lever pivot axis, wherein the rocker is pivotally connected to the lever on one side of the lever pivot axis, and wherein the sensor is coupled to the lever on the other side of the lever pivot axis,
    wherein the rocker is connected to the lever for pivotal movement about a generally horizontal rocker pivot axis generally parallel to the lever pivot axis, and
    wherein the rocker is pivotally connected to the lever by a pin extending along the rocker pivot axis, and wherein the base includes a stop surface configured to engage the pin to limit movement of the lever relative to the base.

2. An apparatus as set forth in claim 1 wherein the lever includes a lever bracket pivotally connected to the base, and a loading bracket that extends from the lever bracket and that is coupled to the sensor.

3. An apparatus as set forth in claim 2 wherein the lever bracket includes spaced sides each connected to the base for pivotal movement about the lever pivot axis.

4. An apparatus as set forth in claim 3 wherein the base includes spaced sides each adjacent a respective one of the sides of the lever bracket, and wherein the lever bracket is pivotally connected to the base by a pivot pin extending along the lever pivot axis and extending through the sides of the base and through the sides of the lever bracket.

5. An apparatus as set forth in claim 1 further comprising a second lever pivotally connected to the base, and a second rocker configured to be connected to the vehicle seat, the second rocker also pivotally connected to the second lever by a second pin, and wherein the sensor is also coupled to the second lever, the sensor configured to detect pivotal movement of the second lever relative to the base to sense the weight of the occupant.

6. An apparatus as set forth in claim 5 wherein the second lever is connected to the base for pivotal movement about a generally horizontal second lever pivot axis, wherein the second rocker is pivotally connected to the second lever on one side of the second lever pivot axis, and wherein the sensor is coupled to the second lever on the other side of the second lever pivot axis.

7. An apparatus as set forth in claim 6 wherein each of the levers has therein an aperture, and wherein the sensor extends through the aperture of both of the levers.

8. An apparatus as set forth in claim 1, wherein the pin extends through the sides of the base through an aperture in the base, wherein the aperture is a larger diameter than the pin such that a variable gap exists between the pin and the aperture, and wherein the edge of the aperture forms the stop surface.

9. An apparatus as set forth in claim 5, wherein the second pin extends through the sides of the base through a second aperture in the base, wherein the second aperture is a larger diameter than the second pin such that a variable gap exists between the second pin and the second aperture, and wherein the edge of the second aperture forms a second stop surface.

10. An apparatus as set forth in claim 4, wherein the rocker includes spaced sides arranged such that the rocker has a U-shaped cross-section, and wherein the pin that pivotally connects the rocker to the lever extends through both of the spaced sides of the rocker and through both of the spaced sides of the lever.

11. An apparatus as set forth in claim 10, wherein the rocker and lever nest together such that a first side of the spaced sides of the lever is positioned adjacent to a first side of the spaced sides of the rocker and a second side of the spaced sides of the lever is positioned adjacent to a second side of the spaced sides of the rocker.

12. An apparatus as set forth in claim 11, wherein the rocker and lever nest inside the spaced walls of the base.

* * * * *